United States Patent Office 3,102,461
Patented Sept. 3, 1963

3,102,461
PHOTOGRAPHIC CAMERA WITH AN AUTOMATIC FLASH OPERATING MECHANISM
Heinz Köppen, Stuttgart, Germany, assignor to Zeiss Ikon Aktiengesellschaft, Stuttgart, Germany
Filed Jan. 24, 1962, Ser. No. 168,363
Claims priority, application Germany Feb. 2, 1961
20 Claims. (Cl. 95—10)

This invention relates to a photographic camera, a photographic objective and a photographic shutter, respectively, provided with an automatic flash operating mechanism.

It is an object of the invention to provide such an automatic flash operating mechanism which upon manual adjustment to a desired flash guide number and a desired distance produces automatically an adjustment of the diaphragm to the required aperture without necessitating any calculations or other thoughtful reflections by the camera user. The required diaphragm aperture which will assure a correct exposure of the film in the camera will be automatically adjusted according to the well known equation $$\text{Diaphragm Aperture} = \text{Guide Number} : \text{Distance}$$

In accordance with the invention the photographic device, such as a camera, is provided with a diaphragm and a diaphragm aperture adjusting means, a flash guide number adjusting member, a distance adjusting member for focussing the camera objective and means for coupling said flash guide number adjusting member with said distance adjusting member so as to operate the member for adjusting the diaphragm aperture to the required size for effecting a predetermined exposure of the film in the camera.

It is an important object of the invention to provide a photographic device of the above mentioned character with a coupling means which includes a differential gearing which is operatively connected with the flash guide number adjusting member, the distance adjusting member and the diaphragm aperture adjusting member.

Still another object of the invention resides in providing a photographic camera objective with a flash guide number adjusting ring, a distance adjusting ring for focussing the camera objective, and a diaphragm provided with a diaphragm aperture adjusting ring, whereby all of said rings are arranged concentrically about the optical axis of the camera objective and means are provided which include a differential gearing for operatively connecting the flash guide number adjusting ring, the distance adjusting ring and the diaphragm aperture adjusting ring for adjusting the diaphragm aperture in response to a manual adjustment of the flash guide number ring and the distance adjusting ring to the required aperture size. The differential gearing consists of a first sun gear attached to and driven by the flash guide number adjusting ring while a second sun gear is provided to be driven by said distance adjusting ring, and a planetary carrier ring having rotatably mounted thereon a planetary gear meshing with both said sun gears. Furthermore, means are provided on the planetary carrier ring for operating the diaphragm aperture adjusting ring.

With these and other objects in view the invention will now be described in more detail with reference to the accompanying drawings which illustrate by way of example a few embodiments of the invention.

Figure 1:
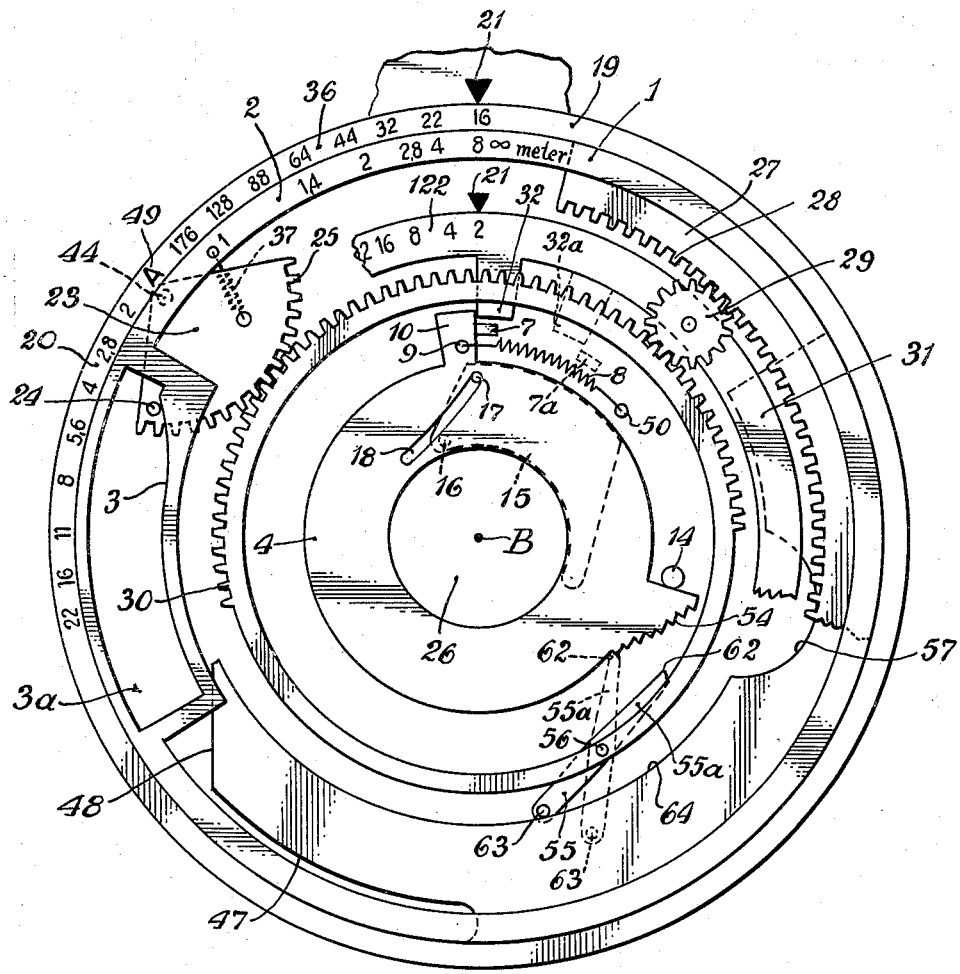
FIG. 1 illustrates diagrammatically a front elevation view of a photographic objective provided with an arrangement for automatically adjusting the diaphragm of the objective in response to adjustments of a flash guide number adjusting member and a distance adjusting member.

Referring to FIG. 1, the rotatably adjustable change-over ring 19 indicates the different ranges within which the camera, the shutter or the objective is able to operate. The flash bulb operating range on this ring 19 is indicated by a flash guide number scale 36, while 49 indicates the rather short range within which the automatic exposure mechanism is operative. This range 49 is provided with a single indicating mark A. A diaphragm aperture scale 20 extends over that range within which the diaphragm aperture may be manually selected or preselected. A stationary part of the camera is provided with a fixed index 21 with respect to which all the mentioned scales are adjustable and readable.

Next to the change-over ring 19 is arranged a distance adjusting ring 1 which is provided with a distance scale 2. This distance scale 2 may also be adjusted relatively to the fixed index 21. The rings 1 and 19 surround concentrically the optical axis B of the camera objective attached to the camera.

The change-over ring 19 is provided on its inner circumference with a circumferentially extending projection 27 which is curved concentrically about the optical axis B and is provided with gear teeth 28. This projection 27 with the gear teeth 28 thereon forms a sun gear of a differential gearing 28 to 31. The change-over ring 19 is also provided on its inner circumference with a disconnecting cam 48 arranged on a curved portion 47 which extends concentrically about the optical axis B. Finally, the change-over ring 19 is provided on its inner circumference with a cam 64 provided with a convex recess 57. The cam 64 is operating a tracking mechanism belonging to the photoelectric exposure meter and which becomes effective when the mark A is moved in opposition to the stationary index 21. This tracking mechanism cooperates with a lever 55 fixedly attached to a shaft 56. One end 55a of the lever 55 is provided with a point 62 adapted to cooperate with abutment steps 54 provided on a diaphragm control ring 4. The lever 55 is inoperative in the position shown in full lines in FIG. 1 because a tracking pin 63 on the lower end of the lever 55 is in engagement with the cam 64. Only when the automatic exposure mark A has been moved in opposition with the stationary index 21, the lower end of the lever 55 will enter the recess 57 in the cam 64 and when this occurs the shaft 56 with the lever 55 thereon is freely rotatable and may assume the position shown in dotted lines in FIG. 1 so that the point 62 of the lever 55 may engage one of the series of abutment steps 54. For a further illustration in what manner the photoelectric exposure meter actuates a tracking member which in turn rotates the shaft 56, attention is called to the inventor's copending U.S. patent application Serial No. 156,740, filed on December 4, 1961, particularly FIG. 8.

The inner circumference of the distance adjusting ring 1 is provided with an inwardly extending portion which has a longitudinal aperture 3a one edge of which forms a control cam 3 which cooperates with a tracking pin 24 provided on a toothed sector 23 pivotally mounted about a stationary pivot pin 44. The toothed sector 23 is provided with gear teeth 25 which are in engagement with a second sun gear 30. A spring 37 constantly urges the toothed sector 25 in a direction in which the tracking pin 24 is maintained in engagement with the control cam 3. The two sun gears 28 and 30 are arranged concentrically about the optical axis B and both are in engagement with the planetary gear 29 the axis of rotation of which is arranged on the planetary carrier ring 31.

The planetary carrier ring 31 is provided on its front face with a diaphragm aperture scale 122 which is visible from the outside of the described arrangement and whose individual values are readable when brought into opposition with the stationary index 21 which is used for reading the scale values provided on the change-over ring 19 and on the distance adjusting ring 1. Furthermore, the planetary carrier ring 31 is provided with a radially extending projection 32 which cooperates with a projection or abutment 10 provided on the rotatable diaphragm aperture adjusting ring 4 which may consist of one of the two customary diaphragm cages. The position of the projection 32 as shown in a solid line indicates the greatest possible diaphragm aperture which in the present case is $f:2$ while the position $32a$ of this projection as shown in a dashed line in FIG. 1 indicates the smallest possible diaphragm aperture which in this particular case is $f:22$.

The diaphragm aperture adjusting ring 4 is, as indicated by the position of one of the diaphragm segments 15, adjusted to the largest diaphragm aperture when the shutter of the photographic camera is tensioned. An operating member 7 is actuated by the shutter tensioning mechanism and will be in the position as shown in a full line in FIG. 1 when the shutter is tensioned. When the camera shutter is released, however, this operating mechanism will assume the position indicated in dashed lines $7a$. Between these two positions 7 and $7a$ is arranged the entire diaphragm aperture adjusting range. The diaphragm aperture adjusting ring 4 which in the tensioned position of the camera is blocked by the operating member 7 which was actuated during the shutter tensioning, is blocked on the other side by a stationary pin 14. A spring 8 is attached to a stationary point 50 and to a point 9 on the diaphragm aperture adjusting ring 4 and is arranged in such a manner that it constantly urges the diaphragm aperture adjusting ring 4 in a direction in which the diaphragm is adjusted to its smallest aperture.

Upon release of the camera the diaphragm aperture adjusting ring 4 rotates rearwardly in clockwise direction a distance depending upon how complete this rearward movement can take place. During this rearward movement the diaphragm is closed more and more. During the closing of the diaphragm the illustrated diaphragm segment 15 (the diaphragm is, of course, formed of a plurality of segments 15) is pivoted about a pivot pin 16 arranged on a second diaphragm cage which, however, is not illustrated. The segment 15 moves into the light passage aperture 26 of the photographic objective and during the rearward movement of the diaphragm aperture adjusting ring 4 is moved in such a manner that the pivot pin 17 controlling this movement is moved downwardly along a curved slot 18 in the ring 4.

The lever 55 which cooperates with the series of abutment steps 54 provided on the diaphragm aperture adjusting ring 4 and operated by the automatic exposure mechanism is preferably mounted on a shaft 56 which is arranged below the sun gear 30.

The operation of this arrangement illustrated in FIG. 1 is as follows:

Upon adjustment of the change over ring 19 to a higher guide number, for instance to 176, the change-over ring 19 performs a clockwise rotation and this causes a corresponding clockwise rotation of the first mentioned sun gear 27, 28. It is assumed that the distance adjusting ring 1 remains in the illustrated position in which the stationary index 21 points to 8 m. Under these conditions the planetary gear 29 including its carrier ring 31 rotates a certain distance in clockwise direction since the planetary gear 29 rolls along the inert stationary sun gear 30. Owing to this movement of the planetary carrier ring 31 its radial projection 32 moves into the position $32a$ indicated in dashed lines and as previously stated, this is the position in which the diaphragm has been adjusted to its smallest size.

When the shutter of the camera is now released, the operating member 7 jumps into the position indicated in dashed lines $7a$ and the rotatable diaphragm aperture adjusting ring 4 as a result of the tensioned spring 8 performs its rearward movement in clockwise direction. As soon as the projection 10 engages the left hand side of the projection $32a$ the smallest aperture possible, namely $f:22$, is formed.

In order to describe the change of the diaphragm aperture in dependence of the distance adjustment, one may start out again with the positions and adjustments of the rings 1 and 19 illustrated in FIG. 1 in which the flash guide number 16 is opposite the distance of 8 m. and both these values are in opposition to the stationary index 21. In this condition the projection 32 on the planetary carrier ring 31 is in the position shown in full lines in FIG. 1 and the result is that the diaphragm is adjusted to its greatest aperture $f:2$. The distance adjustment ring 1 may now be rotated in clockwise direction until the distance scale indicating 2 m. is opposite the guide number 16 which remains in opposition to the stationary index 21. This means that the change-over ring 19 remains in its position and therefore the sun gear 27, 28 also remains in its illustrated position. A movement of the planetary carrier ring 31 and a resulting change in the size of the diaphragm aperture which is performed by a change in the position of the projection 32 can only then take place by means of the cam 3 provided on the distance adjusting ring 1, the toothed sector 25 and the planetary gear 29 which is in mesh with the inner sun gear 30. When the distance adjusting ring 1 is rotated in clockwise direction, the tracking pin 24 on the toothed sector 25 moves along a less steep portion of the control cam 3 so that in view of the effect of the spring 37 the toothed sector 25 performs a rotative movement in counterclockwise direction since the toothed sector 25 is in engagement with the inner sun gear 30. The latter is caused to perform a clockwise movement and since the planetary gear 29 rolls along the now stationary sun gear 27, 28, the planetary carrier ring 31 is rotated a corresponding distance. This movement is calculated in such a manner that the projection 32 remains in a position in which upon a release of the camera shutter a closing of the diaphragm to the aperture $f:8$ is assured. The scale 122 on the front face of the ring 31 permits a reading of these diaphragm values. Intermediate adjustments of guide number and distance will result in corresponding diaphragm aperture values.

When changing the operation of the camera from the flash light range to the automatic exposure operation, it is required that the distance adjustment and the pivotally mounted lever 55 are independently operable. A free rotative movement of the lever 55 is possible as stated previously when the tracking pin 63 of the lever 55 enters into the recess 57 of the cam 64. The required independent adjustability of the distance adjusting ring 1 without causing an operation of the differential gearing is accomplished by first adjusting the mark A opposite the stationary index 21, whereby the severely inclined disconnecting cam 48 on the change-over ring 19 becomes effective. This cam 48 moves the tracking pin 24 on the toothed segment 25 away from the control cam 3 on the distance adjusting ring 1 and fixes the toothed segment 25 in this inoperative position. A rotation of the change-over ring 19 in clockwise direction causes also a rotation of the planetary carrier ring 31 in view of the fact that it is engaged by the sun gear 27, 28 and accordingly the planetary gear 29 rolls along the inner sun gear 30. This causes a movement of the radial projection 32 into an extreme position which corresponds to the smallest diaphragm aperture f:22 or a movement somewhat beyond the same. This means that the radial projection 32 is completely ineffective for forming a diaphragm aperture when the shutter of the camera is released. The range of movement of the diaphragm aperture adjusting ring or of the diaphragm cage 4 is now only dependent upon the position of the lever 55 and its angle of incidence with respect to the series of abutment steps 54.

When the change-over ring 19 is rotatably adjusted still more a small distance in clockwise direction so that the stationary index 21 moves into the range of the manual diaphragm adjustment 20 or of the diaphragm preselecting range, it is necessary that according to the indicated value of the diaphragm aperture scale 20 a corresponding position of the radial projection 32 is secured. When moving the change-over ring 19 from the mark A, which indicates the automatic exposure range, to the manual diaphragm adjusting ring 20 and to the value f:2, then a small rotative movement of the sun gear 28 in clockwise direction takes place which tends to move the planetary carrier ring 31 likewise in clockwise direction. The resulting additional movement of the disconnecting cam 48 causes a rotation of the toothed segment 25 in clockwise direction which causes a rotation of the sun gear 30 in counterclockwise direction. This rotative movement is so calculated that the planetary carrier ring 31 performs also a rotative movement in counterclockwise direction which is terminated in the position indicated by the radial projection 32 shown in solid lines. This position corresponds, however, as already stated, to a diaphragm aperture f:2. The tracking pin 24 on the toothed segment 25 will now enter the concentric slot 47 on the change-over ring 19 whereby the toothed segment 25 is fixed in its inoperative position within the entire range in which a manual selection of the diaphragm aperture is possible. This means that from now on, namely from the selection of a diaphragm aperture f:2 to a smaller diaphragm aperture, the inner sun gear 30 is made stationary.

When a diaphragm aperture is desired which is smaller than f:2, the change-over ring 19 has to be rotated in clockwise direction whereby the planetary gear 29 rolls along the stationary sun gear 30 which has the result that the planetary carrier ring 31 is rotatably adjusted in clockwise direction so that its radial projection 32, depending upon the selected diaphragm aperture, moves a corresponding distance with the ring 31. When the diaphragm is adjusted to the smallest aperture f:22, the radial projection 32 on the ring 31 assumes the position 32a and in view of the now possible return movement of the rotatable diaphragm aperture adjusting ring 4, upon release of the shutter of the camera, the diaphragm is adjusted to its smallest aperture.

Figure 2:
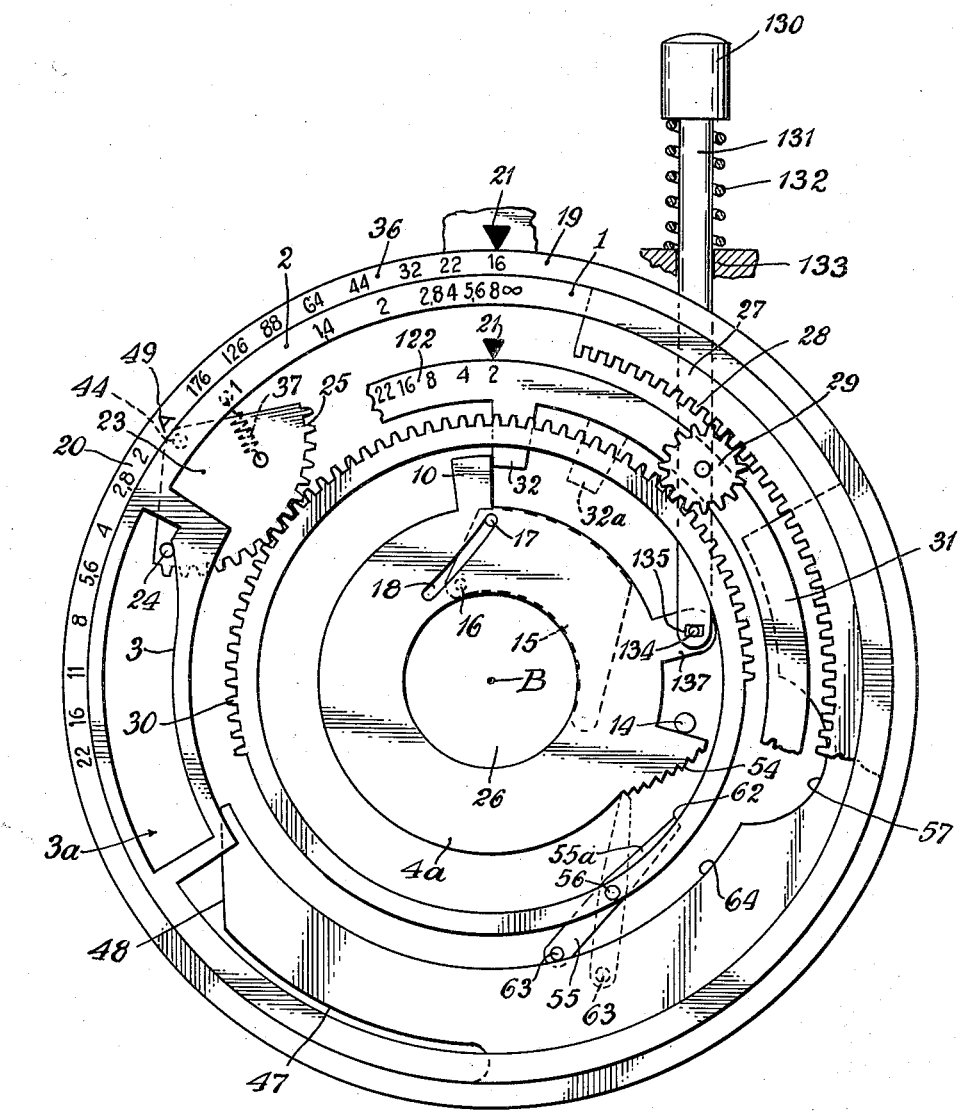
FIG. 2 illustrates in a similar view as FIG. 1 a modified construction of the invention.

FIG. 2 illustrates an embodiment of the invention which differs from the one illustrated in FIG. 1 only by the fact that in place of the spring operated diaphragm mechanism a pressure diaphragm adjusting mechanism is employed. Accordingly, the operating element 7 for the diaphragm aperture adjusting ring 4 and the spring 8 for actuating the latter are dispensed with. In place of these parts is employed a pressure button 130 for operating the diaphragm. This pressure button 130 is mounted on a rod 141 which is slidably supported in a stationary bearing 133 which may be provided in the camera casing. The lower end of this rod 131 is operatively connected with the diaphragm mechanism. The pressure button 130 is adapted to be pushed downwardly against the action of a spring which surrounds the rod 131, whereby one end of the spring engages a shoulder 136 on the pressure button 130, while the other end of the spring 132 rests upon the upper face of the bearing 133. The lower or inner end of the rod 131 is connected by means of a pin and slot connection 134, 135 with a radial projection 137 extending outwardly from the diaphragm aperture adjusting ring 4a.

The operation of the invention illustrated in FIG. 2, as far as the introduction of the distance and guide number values into the diaphragm mechanism is concerned, corresponds completely to the embodiment illustrated in FIG. 1. Solely the rearward movement of the rotatable diaphragm aperture ring 4a upon release of the shutter of the camera is replaced by a manual rearward rotation which is effected by the pressure button arrangement 130 to 137. Furthermore, the formation of the diaphragm aperture by means of the automatic exposure mechanism and the adjustment of the diaphragm within the manual adjusting range indicated by the scale 20 is the same as shown heretofore in connection with FIG. 1.

Figure 3:
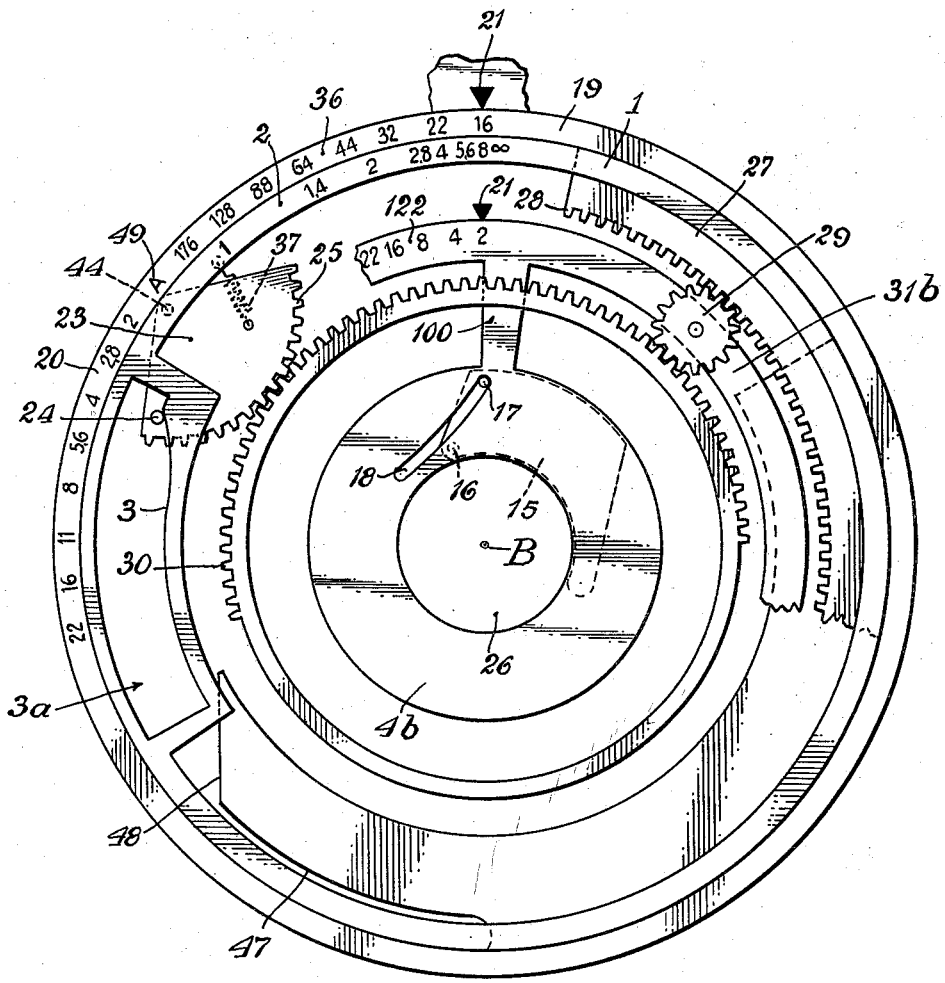
FIGS. 3, 4 and 6 illustrate each another embodiment of the invention in a view similar to FIG. 1.

FIG. 3 illustrates still another embodiment of the invention which differs from the embodiments shown in the FIGS. 1 and 2 by the fact that the spring operated diaphragm mechanism is replaced by an arrangement for a direct adjustment of the diaphragm in dependence of the distance adjustment and the flash guide number adjustment. Accordingly, the embodiment of FIG. 3 provides a direct coupling connection between the diaphragm aperture adjusting ring 4b and the planetary carrier ring 31b in the form of a radial bar 100 which integrally connects these two rings with one another.

Figure 4:
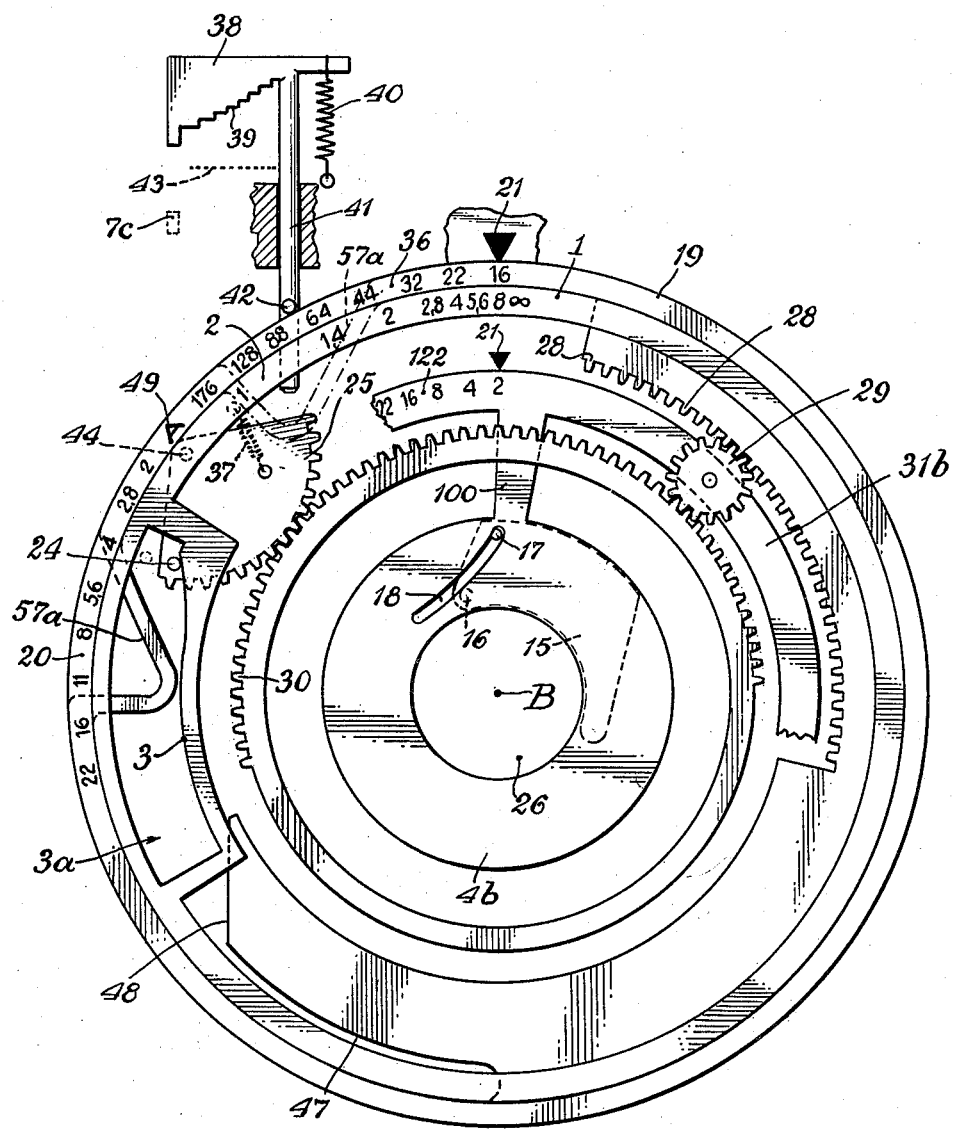

The embodiment of the invention illustrated in FIG. 4 differs from the previously described embodiments in that a tracking mechanism for the automatic exposure operation has been added which dispenses with the previously employed pivotally mounted lever 55 and the series of abutment steps 54, but cooperates with the already present toothed segment 25. The tracking mechanism consists substantially of a tracking body 38 provided with a series of tracking steps 39. Upon tensioning of the camera this tracking body 38 is maintained in position by a blocking element 7c which is operated by the shutter mechanism and is held against the action of a spring 40 with a pin 42 in engagement with the change-over ring 19. The pin 42 is attached to a rod 41 which is integrally formed with the tracking body 38 and is slidably supported in a suitable stationary guide formed for instance in a wall of the camera casing. The dots forming the line 43 indicate different possible positions of a tracking element for the positions of the indicator of the photoelectric exposure meter. This tracking element forms at the same time an abutment for the different steps 39. The changeover ring 19 is again provided with a connecting cam having the shape of a recess 57a which when the mark A is opposite the stationary index 21 permits the rod 41 to drop into this recess 57a whereupon the tracking body 38 can freely move. The disconnecting cam 48 which in this position of the change-over ring 19 becomes effective has lifted the tracking pin 24 on the sector 25 from the control cam 3 on the distance adjusting ring 1 so that any desired distance may be selected within the range of the automatic exposure mechanism. The formation of the required diaphragm aperture is effected in this manner that the tracking body 38 depending upon the position of the tracking element 43 is moved more or less downwardly until one step of the series of steps 39 engages the element 43. When this occurs, the rod 41 presses downwardly upon the toothed segment 25 which is then pivotally moved more or less in clockwise direction causing the sun gear 30 to rotate counterclockwise. The planetary gear 29 which is driven by the sun gear 30 now rotatably moves the planetary carrier ring 31 because the gear 29 rolls along the stationary sun gear 28 and depending upon the movement of the rod 41 the respective diaphragm aperture is adjusted in the diaphragm mechanism.

The operation of this embodiment is as follows: During the adjustment of the mark A in opposition to the stationary index 21 the guide number 176 on the change-over ring 19 passed the index 21 which guide number already determined the smallest diaphragm aperture f:22. When the ring 19 is rotated so that the guide number 176 leaves the index 21 and the mark A moves under the index, the sun gear 28 and the planetary gear 29 on the planetary carrier ring 31 have been moved clockwise into a position which corresponds to the diaphragm aperture f:22. The disconnecting cam 48 has moved the toothed segment 25 with its tracking pin 24 away from the control cam 3 on the distance adjusting ring 1 and has it moved into a position which corresponds to the initial position of the toothed segment 25 with respect to the movement of the tracking body 38 in dependence of the diaphragm aperture formation.

The distance between the tracking body 38 and the steps 39 respectively and the positions of the indicator of the exposure meter as represented by the tracking element 43 is calculated in such a manner that an additional operating path is formed during which an engagement of one of the steps 39 with the element 43 takes place, whereby this additional movement compensates for the overrun of the planetary carrier ring 39 beyond the position which forms the diaphragm aperture f:22. In other words, the distance shown in FIG. 4 between the lowermost adjusting step 39 and the tracking member 43 creates up to an engagement of these parts a path of movement of the rod 41, the toothed segment 25, the sun gear 30 and the planetary carrier ring 31 which effects only a return movement of the planetary carrier ring 31 to that position which corresponds to the diaphragm aperture f:22. If therefore the engagement of the lowest step 39 with the tracking element 43 corresponds to a diaphragm aperture f:22, an engagement of the tracking element 43 with the next higher step 39 corresponds to the next larger diaphragm aperture. The path of movement of the tracking body 38 and therewith of the rod 41 becomes the greater, the later the elements 39 and 43 come into engagement with one another and therefore, there are transmitted to the toothed segment 25 always increased movements in clockwise direction.

In the following will be explained the formation of the diaphragm aperture f:22 within the range of the automatic exposure mechanism. As stated before, when the change-over ring 19 is adjusted from the guide number 176 to the mark A, the planetary carrier ring 31 has been moved clockwise beyond that position which corresponds to the smallest diaphragm aperture. If now the lowest step of the series of steps 39 engages the tracking element 43, the rod 41 will rotate the toothed segment 25 about an angle which produces on the planetary carrier ring 31 a return movement about a distance equal to the distance the planetary carrier ring 31 was moved beyond the diaphragm position f:22. Therefore, the scale 122 on the carrier ring 31 indicates again a diaphragm aperture f:22. If one of the intermediate steps of the series of steps 39 engages the element 43, the rod 41 performs a somewhat greater movement in lengthwise direction. Therefore, the toothed segment 25 will be moved about a somewhat larger angle in clockwise direction and as a result, the rotations of the sun gear 30 and of the planetary carrier ring 31 in counterclockwise direction produce a larger diaphragm aperture and, therefore, on the visible scale 122 appears an intermediate diaphragm value, for instance f:8 or f:5.6. If upon release of the shutter of the camera the highest step 39 comes into engagement with the tracking element 43, the rod 41 performs its greatest movement. This movement will produce a still larger diaphragm aperture by means of the elements 28, 30, 29 and 31 so that the largest diaphragm aperture f:2 is produced.

The FIGS. 1 to 4 illustrate that the adjusting rings and the gears of the differential gearing are constructed as rotatably mounted rings of different diameter of which the smaller sun gear is positioned within the outer sun gear.

Figure 5:
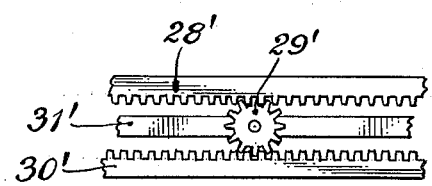
FIG. 5 illustrates diagrammatically a portion of another embodiment of a differential gearing which may be employed in connection with the arrangement of the invention.

FIG. 5, however, illustrates a modified arrangement according to which the sun gears 28', 30' have substantially the same diameter and are axially spaced from each other so that a planetary gear 29' can be arranged between and in mesh with both sun gears 28' and 38'. This is possible by mounting the planetary gear 29' about a radially positioned axis of rotation on a planetary carrier ring 31'.

Figure 6:
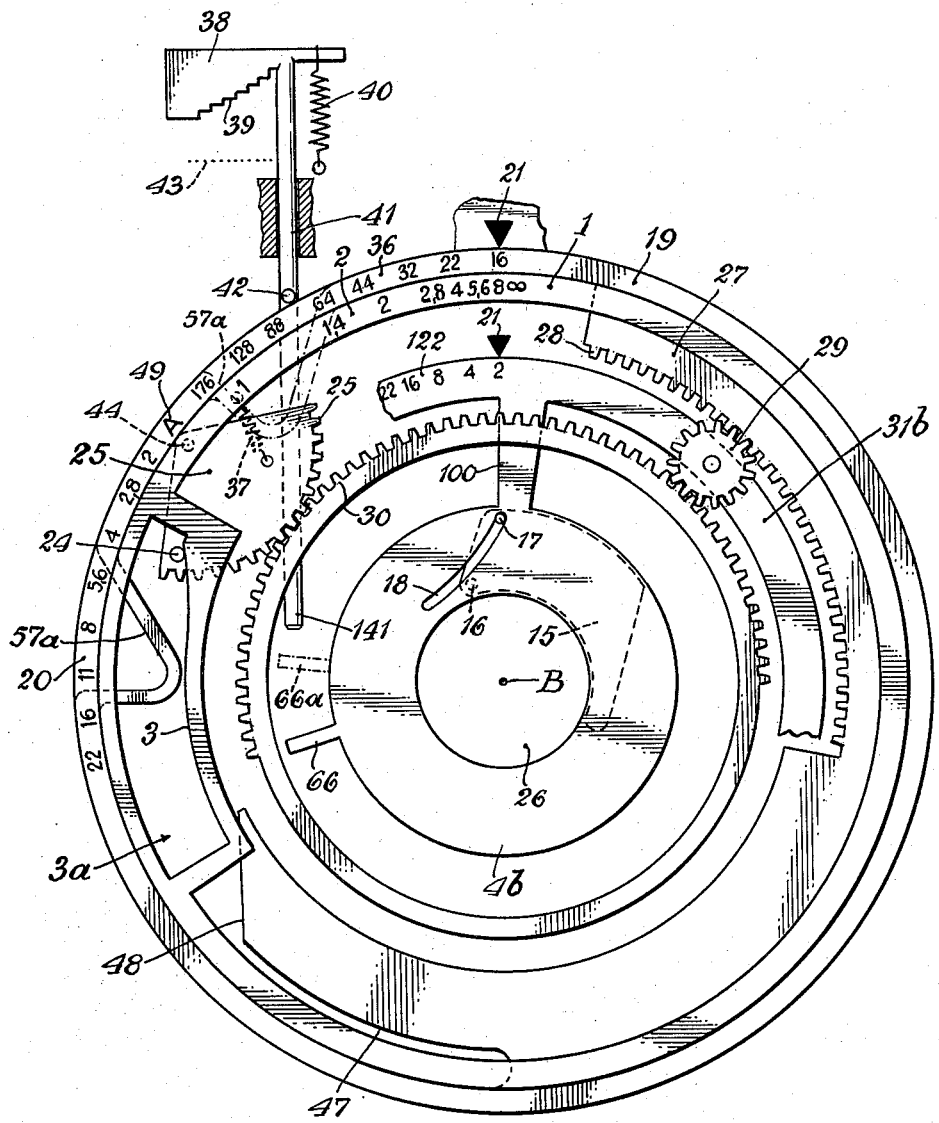

FIG. 6 illustrates an embodiment of the invention which is very similar to the embodiment illustrated in FIG. 4. The difference consists in this that the rod 41 which effects the formation of the diaphragm aperture is not operatively connected with the toothed segment 25 but is so arranged that it may engage a radial projection 66 on the rotatable diaphragm aperture adjusting ring 4. The dash and dotted line position 66a of the radial projection corresponds to the diaphragm aperture f:22, while the position of the radial projection 66 shown in full lines corresponds to the diaphragm aperture f:2. In order to provide this construction, the rod 41 is made somewhat longer as indicated at 141. Instead of engaging a radial projection on the diaphragm aperture adjusting ring 4, the rod 41 may also be arranged in such a manner that it operates the sun gear 30 or the planetary carrier ring 31b. These possibilities of the formation of the diaphragm in dependence from the position of the tracking element on the photoelectric exposure meter may also be employed in connection with spring operated and pressure operated diaphragm mechanisms.

What I claim is:

1. A photographic camera objective comprising in combination:
   (a) a flash guide number adjusting ring,
   (b) a distance adjusting ring for focussing the camera objective,
   (c) a diaphragm provided with a diaphragm aperture adjusting ring,
   (d) all of said rings being arranged concentrically about the optical axis of said camera objective,
   (e) means including a differential gearing for operatively connecting said flash guide number ring, said distance adjusting ring and said diaphragm aperture adjusting ring for adjusting said diaphragm aperture in response to a manual adjustment of said flash guide number ring and said distance adjusting ring to the required aperture size,
   (f) said differential gearing comprising a first sun gear attached to and driven by said flash guide number adjusting ring,
   (g) a second sun gear driven by said distance adjusting ring, and
   (h) a planetary carrier ring having rotatably mounted thereon a planetry gear meshing with both said sun gears, and means on said carrier ring for operating said diaphragm aperture adjusting ring.

2. A photographic objective according to claim 1, in which said planetary carrier ring is provided with a radially extending projection forming an abutment for engaging a radially extending projection on said diaphragm adjusting ring (FIGS. 1 and 2).

3. A photographic objective according to claim 1, including means for rigidly connecting said planetary carrier ring with said diaphragm adjusting ring (FIGS. 3, 4 and 6).

4. A photographic objective according to claim 1, including a toothed sector in driving engagement with said second gun gear, a stationary pivot pin on which said toothed sector is pivotally supported, a tracking pin mounted on said toothed sector, a control cam on said distance adjusting ring, and means for urging said tracking pin in engagement with said control cam for causing a pivotal movement of said toothed sector and a rotative movement of said second sun gear when said distance adjusting ring is rotatably adjusted.

5. A photographic objective according to claim 1, in which said planetary carrier ring is provided with a diaphragm aperture scale which is visible from the exterior of the objective.

6. A photographic objective according to claim 1, in which one of said sun gears is arranged within the other sun gear (FIGS. 1 to 4).

7. A photographic objective according to claim 1, in which said two sun gears have the same diameter and are arranged in axial spaced relation with said planetary gear arranged between the same in operative relation.

8. A photographic objective according to claim 1, in which said flash guide number ring is constructed as change-over ring which upon rotative adjustment with respect to a common stationary index is adapted to selectively adjust the camera objective for flash exposures, automatically adjusted exposures controlled by a photoelectric exposure meter, and for manually controlled exposures.

9. A photographic objective according to claim 1, in which said flash guide number ring is constructed as change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with three serially arranged operating ranges indicated by a guide number scale, an automatic exposure mark and a diaphragm aperture scale.

10. A photographic objective according to claim 1, in which said flash guide number ring is constructed as change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with three serially arranged operating ranges indicated by a guide number scale, an automatic exposure mark and a diaphragm aperture scale, said change-over ring being also provided with a disconnecting cam which renders the drive of said second sun gear by said distance adjusting ring inoperative when said change-over ring is adjusted to either said automatic exposure range or said manually adjusted exposures.

11. A photographic camera objective comprising in combination:
(a) a flash guide number adjusting ring,
(b) a distance adjusting ring for focussing the camera objective,
(c) a diaphragm provided with a diaphragm aperture adjusting ring,
(d) all of said rings being arranged concentrically about the optical axis of said camera objective,
(e) means including a differential gearing for operatively connecting said flash guide number ring, said distance adjusting ring and said diaphragm aperture adjusting ring for adjusting said diaphragm aperture in response to a manual adjustment of said flash guide number ring and said distance adjusting ring to the required aperture size,
(f) said differential gearing comprising a first sun gear attached to and driven by said flash guide number adjusting ring,
(g) a second sun gear driven by said distance adjusting ring, and
(h) a planetary carrier ring having rotatably mounted thereon a planetary gear meshing with both said sun gears, and means on said carrier ring for operating said diaphragm aperture adjusting ring,
(i) said planetary carrier ring being provided with a radially extending projection forming an abutment for engaging a radially extending projection on said diaphragm adjusting ring,
(j) said flash guide number ring being constructed as change-over ring which upon rotative adjustment with respect to a common stationary index is adapted to selectively adjust the camera objective for flash exposures, automatically adjusted exposures controlled by a photoelectric exposure meter, and for manually controlled exposures.

12. A photographic objective according to claim 11, in which upon adjustment of said change-over ring to the position indicating an automatic adjustment of the exposure the resulting adjustment of said planetary carrier ring is such that the radially extending projection thereon moves into such a position that the rotatable diaphragm adjusting ring is adapted to be moved by said exposure meter to any required position.

13. A photographic objective according to claim 11, including means which upon adjustment of said change-over ring to the range for manually controlled exposures move said planetary carrier ring into a position which permits the adjustment of the diaphragm adjusting ring solely by said first sun gear to any desired diaphragm aperture as indicated by said diaphragm aperture scale on said change-over ring.

14. A photographic objective according to claim 1, in which said flash guide number ring is constructed as a change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with an inwardly extending recess, and including a longitudinally movable rod controlled by said photoelectric exposure meter and a series of abutment steps adapted to be engaged by a tracking element of said exposure meter upon release of said camera, said rod being adapted to enter said recess when said change-over ring is adjusted to the position indicating automatic exposure adjustment and causing an adjustment of said diaphragm adjusting ring by said second sun gear and said planetary carrier ring (FIG. 4).

15. A photographic objective according to claim 1 in which said flash guide number ring is constructed as a change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with an inwardly extending recess, and including a longitudinally movable rod controlled by said photoelectric exposure meter and a series of abutment steps adapted to be engaged by a tracking element of said exposure meter upon release of said camera, said rod being adapted to enter said recess when said change-over ring is adjusted to the position indicating automatic exposure adjustment and causing an adjustment of said diaphragm adjusting ring by said second sun gear and said planetary carrier ring, said longitudinally movable rod being so constructed and arranged that said rod is caused to act directly upon said diaphragm adjusting ring (FIG. 6).

16. A photographic objective according to claim 1, in which said flash guide number ring is constructed as a change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with an inwardly extending recess, and including a longitudinally movable rod controlled by said photoelectric exposure meter and a series of abutment steps adapted to be engaged by a tracking element of said exposure meter upon release of said camera, said rod being adapted to enter said recess when said change-over ring is adjusted to the position indicating automatic exposure adjustment and causing an adjustment of said diaphragm adjusting ring by said second sun gear and said planetary carrier ring, said longitudinally movable rod being so arranged that it acts directly upon said second sun gear for adjusting said diaphragm adjusting ring.

17. A photographic objective according to claim 1, in which said flash guide number ring is constructed as a change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with an inwardly extending recess, and including a longitudinally movable rod controlled by said photoelectric exposure meter and a series of abutment steps adapted to be engaged by a tracking element of said exposure meter upon release of said camera, said rod being adapted to enter said recess when said change-over ring is adjusted to the position indicating automatic exposure adjustment and causing an adjustment of said diaphragm adjusting ring by said second sun gear and said planetary carrier ring, said longitudinally movable rod being so arranged that it acts directly upon said planetary carrier ring for adjusting said diaphragm adjusting ring.

18. A photographic objective comprising in combination:
    (a) a flash guide number adjusting ring,
    (b) a distance adjusting ring for focussing the camera objective,
    (c) a diaphragm provided with a diaphragm aperture adjusting ring,
    (d) all of said rings being arranged concentrically about the optical axis of said camera objective, and
    (e) means including a differential gearing for operatively connecting said flash guide number ring, said distance adjusting ring and said diaphragm aperture adjusting ring for adjusting said diaphragm aperture in response to a manual adjustment of said flash guide number ring and said distance adjusting ring to the required aperture size,
    (f) said flash guide number ring being constructed as a change-over ring which upon rotative adjustment with respect to a common stationary index is adapted to selectively adjust the camera objective for flash exposures, automatically adjusted exposures controlled by a photoelectric exposure meter, and for manually controlled exposures.

19. A photographic objective comprising in combination:
    (a) a flash guide number adjusting ring,
    (b) a distance adjusting ring for focussing the camera objective,
    (c) a diaphragm provided with a diaphragm aperture adjusting ring,
    (d) all of said rings being arranged concentrically about the optical axis of said camera objective, and
    (e) means including a differential gearing for operatively connecting said flash guide number ring, said distance adjusting ring and said diaphragm aperture adjusting ring for adjusting said diaphragm aperture in response to a manual adjustment of said flash guide number ring and said distance adjusting ring to the required aperture size,
    (f) said flash guide number ring being constructed as a change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with three serially arranged operating ranges indicated by a guide number scale, an automatic exposure mark and a diaphragm aperture scale.

20. A photographic objective comprising in combination:
    (a) a flash guide number adjusting ring,
    (b) a distance adjusting ring for focussing the camera objective,
    (c) a diaphragm provided with a diaphragm aperture adjusting ring,
    (d) all of said rings being arranged concentrically about the optical axis of said camera objective, and
    (e) means including a differential gearing for operatively connecting said flash guide number ring, said distance adjusting ring and said diaphragm aperture adjusting ring for adjusting said diaphragm aperture in response to a manual adjustment of said flash guide number ring and said distance adjusting ring to the required aperture size,
    (f) said flash guide number ring being constructed as a change-over ring which upon rotative adjustment with respect to a common stationary index is adapted to selectively adjust the camera objective for flash exposures, automatically adjusted exposures controlled by a photoelectric exposure meter, and for manually controlled exposures, said change-over ring being provided with three serially arranged operating ranges indicated by a guide number scale, an automatic exposure mark and a diaphragm aperture scale, said change-over ring being also provided with a disconnecting cam which renders the drive of said second sun gear by said distance adjusting ring inoperative when said change-over ring is adjusted to either said automatic exposure range or said manually adjusted exposures.

References Cited in the file of this patent
UNITED STATES PATENTS

| | | |
|---|---|---|
| 2,953,978 | Rentschler | Sept. 27, 1960 |
| 2,993,425 | Rentschler | July 25, 1961 |
| 3,029,718 | Rentschler | Apr. 17, 1962 |